US012723451B2

(12) United States Patent
Leinweber

(10) Patent No.: US 12,723,451 B2
(45) Date of Patent: Sep. 1, 2026

(54) DRIVER ELEMENT FOR A WINDOW PANE OF A MOTOR VEHICLE

(71) Applicant: Bayerische Motoren Werke Aktiengesellschaft, Munich (DE)

(72) Inventor: Stefan Leinweber, Herrsching am Ammersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/115,828

(22) PCT Filed: Oct. 24, 2023

(86) PCT No.: PCT/EP2023/079530

§ 371 (c)(1),
(2) Date: Mar. 27, 2025

(87) PCT Pub. No.: WO2024/110135

PCT Pub. Date: May 30, 2024

(65) Prior Publication Data

US 2026/0103930 A1 Apr. 16, 2026

(30) Foreign Application Priority Data

Nov. 21, 2022 (DE) ..................... 10 2022 130 706.9

(51) Int. Cl.
*E05D 15/16* (2006.01)

(52) U.S. Cl.
CPC ........ *E05D 15/165* (2013.01); *E05Y 2201/64* (2013.01); *E05Y 2600/456* (2013.01); *E05Y 2600/502* (2013.01); *E05Y 2900/55* (2013.01)

(58) Field of Classification Search
CPC .............. E05D 15/165; B60J 5/04; B60J 1/17
See application file for complete search history.

(56) References Cited

U.S. PATENT DOCUMENTS 10,316,695 B2 * 6/2019 Renggli ................ F01D 25/005
11,168,501 B2 * 11/2021 Pavlovic ............... E05F 11/382
(Continued)

FOREIGN PATENT DOCUMENTS

DE 3419542 A1 * 11/1985
DE 10 2005 008 629 A1 9/2006
(Continued)

OTHER PUBLICATIONS

DE_3419542_A1_I English translation from espacenet (Year: 1985).*
(Continued)

*Primary Examiner* — Muhammad Ijaz
*Assistant Examiner* — Susan M. Heschel
(74) *Attorney, Agent, or Firm* — Crowell & Moring LLP

(57) ABSTRACT

A driver element for securing a window pane of a motor vehicle to a guide device of a window lifter. The driver element comprises an inner clamping element which comes into contact with the window pane face facing the interior of the motor vehicle, an outer clamping element which comes into contact with the window pane face facing away from the interior, a main part for attaching the driver element to the guide device, and a tensioning element which secures the outer clamping element to the main part. The inner clamping element and the outer clamping element form a single receiving gap for the window pane. The outer clamping element comprises a spring element arranged so as to exert a clamping force induced via the tensioning element onto the window pane located in the receiving gap.

19 Claims, 1 Drawing Sheet

(56) References Cited

U.S. PATENT DOCUMENTS

| | | | | |
|---|---|---|---|---|
| 11,499,361 | B2 * | 11/2022 | Magazzini | E05F 11/488 |
| 12,467,303 | B2 * | 11/2025 | Barr | E05F 11/385 |

FOREIGN PATENT DOCUMENTS

| | | | | | |
|---|---|---|---|---|---|
| DE | 102006059853 | A1 | * | 8/2007 | E05F 11/385 |
| DE | 102007054406 | A1 | * | 5/2009 | E05F 11/385 |
| DE | 10 2021 115 188 | A1 | | 12/2022 | |
| JP | 2003-328640 | A | | 11/2003 | |
| KR | 20030093391 | A | * | 12/2003 | B60J 1/17 |

OTHER PUBLICATIONS

DE102006059853A1 English translation from espacenet (Year: 2006).*
DE102007054406A1 English translation from espacenet (Year: 2007).*
KR20030093391A English translation from espacenet (Year: 2003).*
International Search Report (PCT/ISA/210) issued in PCT Application No. PCT/EP2023/079530 dated Jan. 24, 2024 with English translation (6 pages).
German-language Written Opinion (PCT/ISA/237) issued in PCT Application No. PCT/EP2023/079530 dated Jan. 24, 2024 with English translation (8 pages).
German-language Office Action issued in German Application No. 10 2022 130 706.9 dated Jul. 25, 2023 (9 pages).

* cited by examiner

DRIVER ELEMENT FOR A WINDOW PANE OF A MOTOR VEHICLE

BACKGROUND AND SUMMARY

The present disclosure relates to a driver element for securing a window pane of a motor vehicle to a guide device of a window lifter, and a motor vehicle comprising the driver element.

DE 10 2007 054 406 A1 relates to a driver element for securing a window pane of a motor vehicle to a guide device of a window lifter with an inner clamping jaw which comes into contact with the window pane face which faces an interior of the motor vehicle in the installed state, and an outer clamping jaw, wherein the inner clamping jaw and the outer clamping jaw form a receiving gap for the window pane, and comprising a main part for attaching the driver element to the guide device. The outer clamping jaw is arranged substantially fixedly on the main part.

DE 10 2005 008 629 A1 relates to a device for the releasable connection of a movable window pane of a motor vehicle to a driver element of a window lifter, wherein the device has first and second clamping means which are directly or indirectly supported on opposing clamping surfaces of the two side surfaces of the window pane. A tensioning device which clamps the clamping means against the respective clamping surface along a tensioning axis is also provided, wherein the tensioning axis extends through an aperture in the window pane. The clamping surfaces extend in each case at a distance from the tensioning axis and encompass the tensioning axis at least in a partially annular manner.

Against the background of this prior art, an object of the present disclosure is to specify a device which is suitable for enriching the prior art.

Accordingly, the object is achieved by a driver element for securing a window pane of a motor vehicle to a guide device of a window lifter.

The window lifter is a technical apparatus which is designed to lift and lower the window pane of a side window of a motor vehicle. The window lifter can be an electrical window lifter. In addition to the guide device which can have two guide rails, the window lifter can comprise an electric motor for operating the window lifter. The electric window lifter can comprise cable pulls, wherein the electric motor can drive a cable drum via a worm/spur gear. The two ends of a steel cable can be wound thereon such that during rotation the one end is wound up and the other end is wound off. The pull cable can pull via a Bowden cable and pulleys the driver elements or window fastenings running on the two guide rails; the cable end can be wound up again onto the cable drum without tension. The ends of the two Bowden cable sheaths can be held resiliently on the housing of the drive in order to bring a certain degree of flexibility into the system. This is merely one possible embodiment of the window lifter, and the window lifter can also be designed differently therefrom, as known to a person skilled in the art.

The driver element comprises an inner clamping element which comes into contact with the window pane face which faces the interior of the motor vehicle in the installed state.

In the present case "coming into contact" can be described as being directly and/or indirectly in physical contact. In other words, the inner clamping element is directly or indirectly in contact with the window pane, optionally over the surface thereof.

The "installed state" can be understood to mean the state in which both the driver element and the window pane are fitted in or on the motor vehicle.

The driver element further comprises an outer clamping element which comes into contact with the window pane face which faces away from the interior of the motor vehicle in the installed state.

That described above with reference to the inner clamping element also applies analogously to the outer clamping element. In one possible embodiment, the clamping elements can also be denoted as clamping jaws.

The driver element further comprises a main part for attaching the driver element to the guide device and a tensioning element which secures the outer clamping element to the main part.

The inner clamping element and the outer clamping element form a single receiving gap for the window pane.

The window pane can be introduced from above into this receiving gap. Thus an aperture in the window pane, for example in the form of a through-hole, is not required for mounting the window pane on the driver element. A width of the receiving gap can be adapted to a width of the window pane.

The outer clamping element comprises a spring element which is arranged and designed so as to exert a clamping force, induced via the tensioning element, onto the window pane located in the receiving gap in the installed state.

In other words, the inner clamping element can be substantially stationary, such that the window pane inserted into the receiving gap is pushed from outside by way of the outer clamping element against the inner clamping element. The window pane is clamped or tensioned thereby between the inner and the outer clamping element and can no longer move substantially relative to the driver element when the motor vehicle is traveling, as long as the clamping force or the frictional force resulting from the clamping force is not exceeded.

One challenge in window panes, in particular LSG panes (LSG stands for laminated safety glass), of a side window of a motor vehicle is to generate a force distribution on the window pane which fulfills requirements, such that excessive stress on the glass material is prevented.

A pane is conventionally supported via a system with a window lifter slider, which in the present case is denoted as a driver element, and a door sill seal which seals the side doors outwardly (so-called external window shaft seal). This door sill seal provides a relatively large support surface for the window pane. However, the door sill seal is only suitable as a support to a limited extent since the sealing requirement has opposing goals to supporting the window panes. Generally the window pane has a Y-shaped working path of the sealing lips of the door sill seal, which are in contact with the window pane, of approximately 2 mm. This elastic component makes the attachment of the window panes in the motor vehicle very flexible, which in turn can lead to undesired effects when traveling at greater speeds (for example 180 km/h) since the window pane has to close again cleanly after it has been opened. This is challenging, therefore, since the rigidity of the incorporation of the window pane in the overall door-to-motor vehicle assembly is limited by the door sill seal.

In the proposed driver element, a support of the window pane on the door sill seal can be dispensed with due to the above-described embodiment. In other words, the window pane can be supported exclusively by the slider or driver element.

Optional developments of the above-described driver element are explained in detail below.

The outer clamping element can comprise a disk spring for exerting the clamping force, induced via the tensioning element, onto the window pane located in the receiving gap, the inner face thereof being into contact with the window pane face which faces away from the interior of the motor vehicle in the installed state, and the outer face thereof being connected to the tensioning element via a tensioning plate.

The disk spring can have the shape of a lateral surface of a flat truncated cone. The disk spring can be compressed elastically between its edge circles by the tensioning plate (until it is deformed to a maximum extent to form a planar disk), wherein normal stresses (compressive and tensile stresses) are formed in the material of the disk spring as a reaction to the forces introduced. The disk spring can transfer the forces acting via the tensioning plate from the tensioning element to the outer face of the disk spring over the surface to the window pane. As a result, a sufficient fixing of the window pane is possible without excessive stress on this window pane.

The outer clamping element can comprise a tensioning plate for exerting the clamping force, induced via the tensioning element, onto the window pane located in the receiving gap, the upper end thereof being in contact with the window pane face which faces away from the interior of the motor vehicle in the installed state, and the lower end thereof being connected to the tensioning element in the installed state.

The tensioning plate can comprise two pressure arms which connect the lower end of the tensioning plate in the installed state to the upper end of the tensioning plate in the installed state, such that two pressure points located in a first row are formed at the upper end of the tensioning plate in the installed state between the tensioning plate and the window pane located in the receiving gap.

The tensioning plate can comprise three pressure arms which extend from the upper end of the tensioning plate in the installed state in the direction of the lower end of the tensioning plate in the installed state, and which terminate above the lower end in the installed state such that three pressure points located in a second row are formed between the tensioning plate and the window pane located in the receiving gap.

Similar to the disk spring, the forces acting via the tensioning plate from the tensioning element to the outer face of the disk spring can be transferred over the surface to the window pane by way of the pressure arms of the tensioning plate. As a result, a sufficient fixing of the window pane is made possible without excessive stress on this window pane.

The tensioning plate and/or the disk spring can comprise steel or consist thereof.

It is possible to arrange a plastics insert in the receiving gap, the plastics insert being located in each case between the window pane and the inner clamping element and the outer clamping element in the installed state.

The receiving gap can be arranged entirely above the tensioning element in the installed state. This provides the advantage that the tensioning element, optionally designed as a screw, can be already pre-installed, i.e. can be installed on the driver element before inserting the window pane. The main part and the inner clamping element can be designed in one piece, i.e. as a single component.

The clamping force, which is induced in the installed state via the tensioning element, can act in a motor vehicle width direction.

The tensioning element can have a screw which is secured in the main part or can be designed as such, wherein a longitudinal direction of the screw can extend in the motor vehicle width direction in the installed state such that, by tightening the screw, the clamping force is increased in the motor vehicle width direction.

That described above is summarized below and in other words relative to a more specific embodiment of the disclosure, wherein the following statements are described as non-limiting for the disclosure: the lowerable pane of a vehicle which can have a height of approximately 400-700 mm can be clamped at a clamping height of 50 to 60 millimeters. An asymmetrical tensioning plate can function as a three-point support. The longer arm of the tensioning plate can press onto a disk spring which in turn can press onto a plastics intermediate layer and then onto the pane. With this operating principle, the pane can be clamped at a support height of approximately 50 to 60 millimeters. The disk spring can distribute the force over a large surface area onto the pane which is optionally designed as a laminated safety glass pane, such that excessive stress on the pane can be avoided. The tensioning plate which presses onto the disk spring, and the disk spring itself, can be designed in each case as a stamped part, for example from steel. The pane can be protected by the plastics intermediate layer or a plastics shoe which improves the pressure distribution. If required, this shoe can be provided as a 2K part (two-components) with a rubber layer in order to improve even further the force distribution and force introduction into the pane. It is also conceivable, however, that the tensioning plate functions as an asymmetrical three-point flexible support and longer arms of the tensioning plate are shaped such that a double path is produced. With this shape of the pressure arms which press onto the pane, the pane can be tensioned at a height of approximately 50 to 60 mm, since two rows of pressure points are produced. One row has two pressure points and the other row has three pressure points. The total clamping force can thus be distributed to a total of five pressure points.

A motor vehicle is also provided, the motor vehicle having a motor vehicle side door with the driver element arranged therein and a window lifter with a guide device connected to the driver element.

The motor vehicle can be a passenger motor vehicle, in particular an automobile, and/or a truck.

It is conceivable that the motor vehicle has a window pane which is received in the receiving gap of the driver element, wherein the inner clamping element and/or the outer clamping element have dimensions such that in a closed state of the window pane they protrude into a sill region of a window opening of the motor vehicle side door which is closed by the window pane.

In other words, the inner clamping element and/or the outer clamping element can protrude into a region in which the seal supporting the window pane is conventionally provided. It should be mentioned here that the inner clamping element and/or the outer clamping element can have different shapes, such as for example oval or trapezoidal. In particular, with a trapezoidal design, a length of the inner clamping element and/or the outer clamping element can increase from top to bottom.

BRIEF DESCRIPTION OF THE DRAWINGS

Two embodiments are described below with reference to FIGS. 1 to 4.

DETAILED DESCRIPTION OF THE DRAWINGS

In each case a Cartesian coordinate system is shown in FIGS. 1 to 4, the X-axis thereof extending from a front to a rear of a motor vehicle, not shown in more detail, which thus specifies a motor vehicle longitudinal direction X. The Y-axis standing perpendicularly to the X-axis runs in a motor vehicle width direction Y, such that the motor vehicle longitudinal direction X and the motor vehicle width direction Y span a substantially horizontal plane. The Z-axis standing perpendicularly both to the motor vehicle longitudinal direction X and the motor vehicle width direction Y specifies a motor vehicle height direction Z which runs from top to bottom. This is the orientation in the installed state of a driver element 1, 11, shown in FIGS. 1 to 4.

Figure 1:
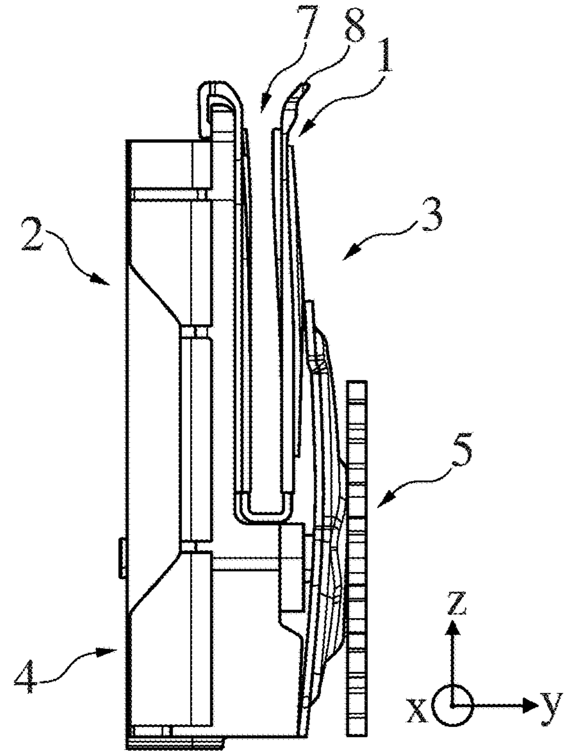
FIG. 1 shows schematically a side view of a driver element for securing a window pane of a motor vehicle to a guide device of a window lifter according to a first embodiment.
Figure 2:
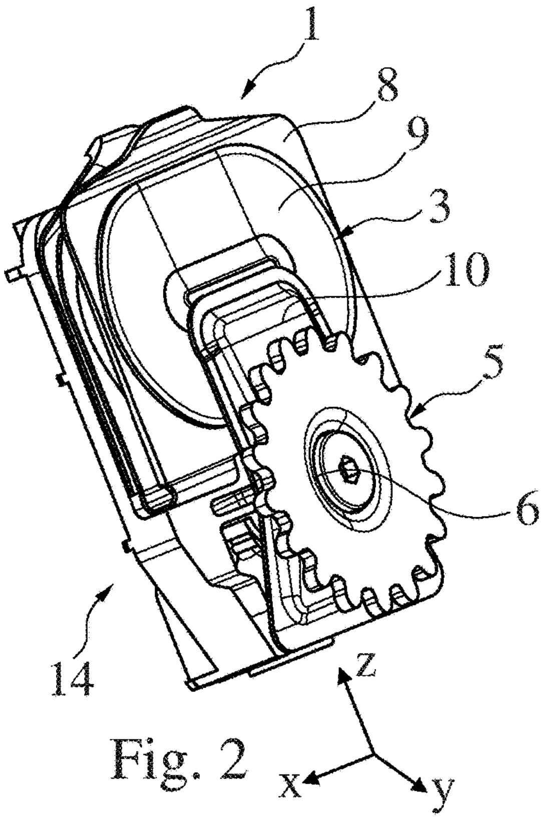
FIG. 2 shows schematically a perspective view of the driver element of FIG. 1.
Figure 3:
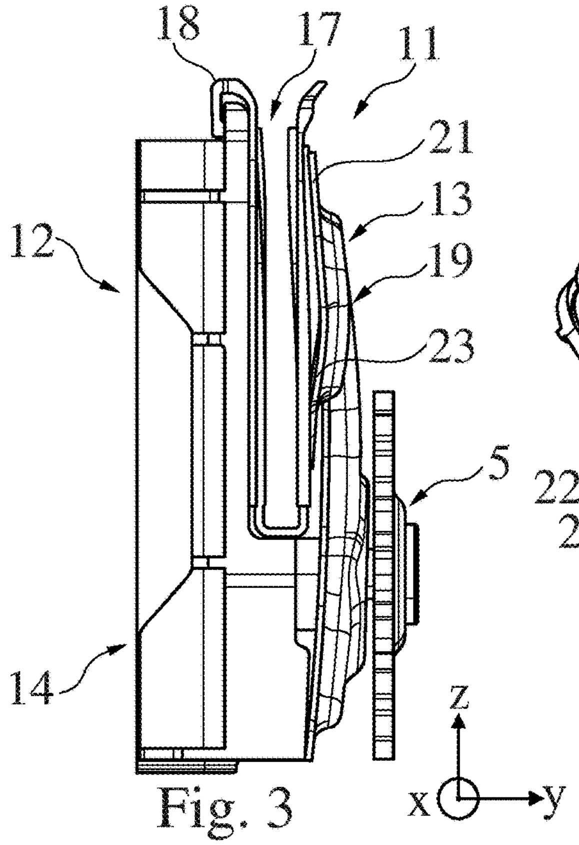
FIG. 3 shows schematically a side view of a driver element for securing a window pane of a motor vehicle to a guide device of a window lifter according to a second embodiment; and, FIG. 4 shows schematically a perspective view of the driver element of FIG. 3.
Figure 4:
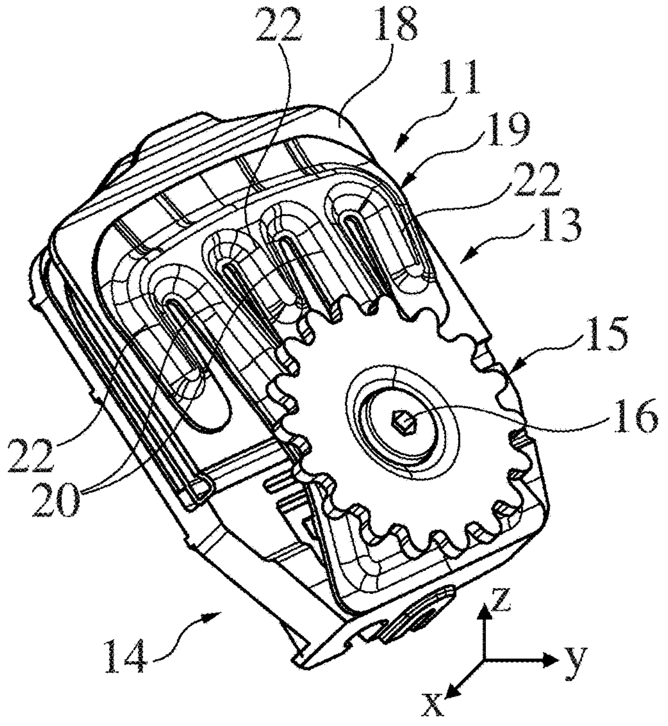

FIGS. 1 to 4 show in each case the driver element 1, 11 for securing a window pane (not shown) of the motor vehicle to a guide device of a window lifter (not shown), wherein FIGS. 1 and 2 relate to a first embodiment and FIGS. 3 and 4 relate to a second embodiment. The driver element 1, 11 is described below, wherein the description applies in each case to the two embodiments, unless it is explicitly specified that a specific part applies only to one of the two embodiments.

The driver element 1, 11 comprises two clamping elements 2, 12, 3, 13. More specifically, the driver element 1, 11 comprises a stationary inner clamping element 2, 12 which comes into contact with the window pane face which faces an interior of the motor vehicle in the installed state, and an outer clamping element 3, 13 which comes into contact with the window pane face which faces away from the interior of the motor vehicle in the installed state.

The driver element 1, 11 also comprises a main part 4, 14 which is designed in one piece with the inner clamping element 2, 12 for attaching the driver element 1, 11 to the guide device, and a tensioning element 5, 15 which has a screw 6, 16 and which secures the outer clamping element 3, 13 to the main part 4, 14.

The screw 6, 16 of the tensioning element 5, 15 which is secured in the main part 4, 14 has a longitudinal direction which extends in the motor vehicle width direction Y in the installed state such that, by tightening the screw 6, 16, a clamping force can be increased in the motor vehicle width direction Y (or can be reduced by loosening the screw 6, 16), explained below in detail.

The inner clamping element 2, 12 and the outer clamping element 3, 13 form a single receiving gap 7, 17 for the window pane, into which the window pane can be inserted from the side from the motor vehicle longitudinal direction X and/or from above from the motor vehicle height direction Z. The receiving gap 7, 17 is arranged entirely above the screw 6, 16 of the tensioning element 5, 15 in the installed state.

A plastics insert 8, 18 which is substantially U-shaped in cross section is arranged in the receiving gap 7, 17, the plastics insert being located in each case between the window pane and the inner clamping element 2, 12 and the outer clamping element 3, 13 in the installed state.

In the two embodiments, the outer clamping element 3, 13 comprises a spring element which is arranged and designed so as to exert a clamping force, induced via the tensioning element 5, 15, onto the window pane located in the receiving gap 7, 17 in the installed state.

In the first embodiment of the driver element 1, shown in FIGS. 1 and 2, the outer clamping element 3 comprises a disk spring 9 for exerting the clamping force, induced via the tensioning element 5, onto the window pane located in the receiving gap 7. The inner face of the disk spring 9 is in contact with the window pane face which faces away from the interior of the motor vehicle in the installed state, and the outer face of the disk spring 9 is connected to the tensioning element 5 via a tensioning plate 10.

In the second embodiment of the driver element 1, shown in FIGS. 3 and 4, in which the plastics insert 18 can act as a spring element, the outer clamping element 13 comprises a tensioning plate 19 for exerting the clamping force, induced via the tensioning element 5, onto the window pane located in the receiving gap. The upper end of the tensioning plate 19 is in contact with the window pane face which faces away from the interior of the motor vehicle in the installed state, and the lower end of the tensioning plate 19 is connected to the tensioning element 5, 15 in the installed state. The tensioning plate 19 comprises two pressure arms 20 which connect the lower end of the tensioning plate 19 in the installed state to the upper end of the tensioning plate 19 in the installed state, such that two pressure points 21 located in a first row are formed at the upper end of the tensioning plate 19 in the installed state between the tensioning plate 19 and the window pane located in the receiving gap. The tensioning plate 19 also comprises three pressure arms 22 which extend from the upper end of the tensioning plate 19 in the installed state in the direction of the lower end of the tensioning plate 19 in the installed state, and which terminate above the lower end of the tensioning plate 19 in the installed state, such that three pressure points 23 located in a second row are formed between the tensioning plate 19 and the window pane located in the receiving gap.

In the two embodiments, the tensioning plate and/or the disk spring can comprise steel or consist thereof.

In the two embodiments, the clamping force, induced via the tensioning element, acts in a motor vehicle width direction Y in the installed state, such that due to the clamping force the window pane fixes the driver element 1, 11 in the motor vehicle width direction Y. Due to the introduction of the clamping force over the surface into the window pane according to the above-described embodiments, such a strong fixing of the window pane can result in a support thereof on a seal of the side door being able to be dispensed with.

In addition, it should be mentioned that the outer and/or the inner clamping element 2, 12, 3, 13, namely as shown in FIG. 1, can be designed to be oval, but a trapezoidal shape is also conceivable. The outer and/or the inner clamping element 2, 12, 3, 13 in a closed state of the window pane can extend into a sill region of a window opening of the motor vehicle side door which is closed by the window pane, in order to replace a seal conventionally used in this region for supporting the window pane.

LIST OF REFERENCE SIGNS

1, 11 Driver element
2, 12 Inner clamping element

3, 13 Outer clamping element
4, 14 Main part
5, 15 Tensioning element
6, 16 Screw
7, 17 Receiving gap
8, 18 Plastics insert
9 Disk spring
10, 19 Tensioning plate
20, 22 Pressure arms
21, 23 Pressure points
X Motor vehicle longitudinal direction
Y Motor vehicle width direction
Z Motor vehicle height direction

The invention claimed is:

1. A driver element for securing a window pane of a motor vehicle to a guide device of a window lifter, the driver element comprising:

an inner clamping element which comes into contact with the window pane face which faces an interior of the motor vehicle in the installed state, an outer clamping element which comes into contact with the window pane face which faces away from the interior of the motor vehicle in the installed state, a main part for attaching the driver element to the guide device and a tensioning element which secures the outer clamping element to the main part, wherein the inner clamping element and the outer clamping element form a single receiving gap for the window pane, and wherein the outer clamping element comprises a spring element which is arranged and designed so as to exert a clamping force, induced via the tensioning element, onto the window pane located in the receiving gap in the installed state, and wherein the receiving gap is arranged entirely above a screw of the tensioning element in the installed state.

2. The driver element according to claim 1, wherein the outer clamping element comprises a disk spring for exerting the clamping force, induced via the tensioning element, onto the window pane located in the receiving gap, the inner face thereof being in contact with the window pane face which faces away from the interior of the motor vehicle in the installed state, and the outer face thereof being connected to the tensioning element via a tensioning plate.

3. The driver element according to claim 2, wherein the tensioning plate and/or the disk spring comprise steel or consist thereof.

4. The driver element according to claim 2, wherein the disk spring has a shape of a lateral surface of a flat truncated cone.

5. The driver element according to claim 1, wherein the outer clamping element comprises a tensioning plate for exerting the clamping force, induced via the tensioning element, onto the window pane located in the receiving gap, the upper end thereof being in contact with the window pane face which faces away from the interior of the motor vehicle in the installed state, and the lower end thereof being connected to the tensioning element in the installed state.

6. The driver element according to claim 5, wherein the tensioning plate comprises:

two pressure arms which connect the lower end of the tensioning plate in the installed state to the upper end of the tensioning plate in the installed state, such that two pressure points located in a first row are formed at the upper end of the tensioning plate in the installed state between the tensioning plate and the window pane located in the receiving gap, and three pressure arms which extend from the upper end of the tensioning plate in the installed state in the direction of the lower end of the tensioning plate in the installed state, and which terminate above the lower end of the tensioning plate in the installed state, such that three pressure points located in a second row are formed between the tensioning plate and the window pane located in the receiving gap.

7. The driver element according to claim 1, wherein a plastics insert is arranged in the receiving gap, the plastics insert being located in each case between the window pane and the inner clamping element and the outer clamping element in the installed state.

8. The driver element according to claim 7, wherein the plastics insert is substantially U-shaped in cross section.

9. The driver element according to claim 1, wherein the clamping force, induced via the tensioning element, acts in a motor vehicle width direction in the installed state.

10. The driver element according to claim 9, characterized in that the tensioning element has a screw which is secured in the main part or is designed as such, wherein a longitudinal direction of the screw extends in the motor vehicle width direction in the installed state such that, by tightening the screw, the clamping force is increased in the motor vehicle width direction.

11. A motor vehicle having a motor vehicle side door with a driver element arranged therein, according to claim 1, and a window lifter with a guide device connected to the driver element.

12. The motor vehicle according to claim 11, wherein the motor vehicle has a window pane which is received in the receiving gap of the driver element, wherein the inner clamping element and/or the outer clamping element have dimensions such that in a closed state of the window pane they protrude into a sill region of a window opening of the motor vehicle side door which is closed by the window pane.

13. The motor vehicle according to claim 11, wherein the window lifter is an electrical window lifter.

14. The motor vehicle according to claim 11, wherein the motor vehicle is a passenger motor vehicle.

15. The driver element according to claim 1, wherein the main part and the inner clamping element are designed in one piece.

16. The driver element according to claim 1, wherein the window pane is insertable into the receiving gap from the side from a motor vehicle longitudinal direction and/or from above from a motor vehicle height direction.

17. The driver element according to claim 1, wherein the inner clamping element is stationary.

18. The driver element according to claim 1, wherein the clamping force is distributed to five pressure points, two pressure points in a first row and three pressure points in a second row.

19. The driver element according to claim 1, wherein the outer clamping element and/or the inner clamping element has an oval or trapezoidal shape.

* * * * *